No. 894,660. PATENTED JULY 28, 1908.
J. J. KEEN.
ADJUSTABLE SUPPORT FOR CULINARY VESSELS.
APPLICATION FILED APR. 2, 1908.

UNITED STATES PATENT OFFICE.

JAMES J. KEEN, OF PHILADELPHIA, PENNSYLVANIA.

ADJUSTABLE SUPPORT FOR CULINARY VESSELS.

No. 894,660.   Specification of Letters Patent.   Patented July 28, 1908.

Application filed April 2, 1908. Serial No. 424,703.

*To all whom it may concern:*

Be it known that I, JAMES J. KEEN, a citizen of the United States, residing in the city and county of Philadelphia, State of Pennsylvania, have invented a new and useful Adjustable Support for Culinary Vessels, of which the following is a specification.

My invention relates to means whereby a utensil or vessel adapted for stewing, cooking, frying, boiling or other culinary purposes may be placed nearer to or further from the fire to accomplish such purposes according to requirements of the same, the device embodying a support for the vessel, the same being vertically movable and adjustable, a guide for said support in its movements, and a device for controlling the same in its adjusted position.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1:
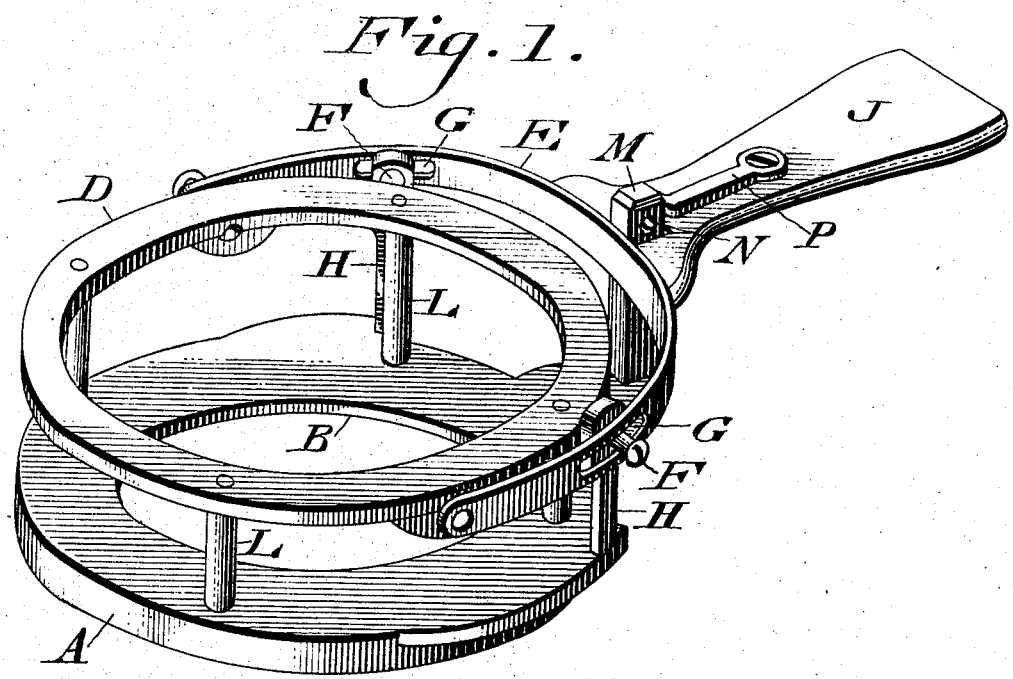
Figure 2:
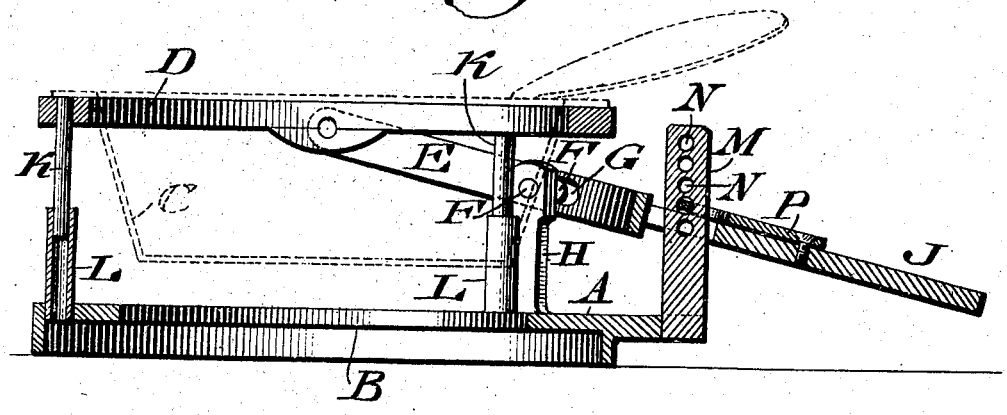

Figure 1 represents a perspective view of an adjustable support for a stewing, cooking, frying, boiling or other culinary vessel embodying the invention. Fig. 2 represents a partial side elevation and partial vertical section thereof.

Similar letters of reference indicate corresponding parts in the figures.

Referring to the drawings:—A designates the base of a support adapted to be placed on the top plate of a stove, range, etc., it having an opening B therein to receive the bottom or bottom portion of a pan, kettle or other vessel C shown in dotted lines, so as to subject said vessel to the products of combustion for purposes of stewing, cooking, frying, boiling, etc. D designates a frame on which said pan, kettle, etc. may be sustained or held, said frame being located above the base A and having pivotally connected with its side at opposite places thereon the arm E, which comprising a lever is fulcrumed by the pins or screws F and slots G on the posts H, which latter rise from the base A, said slots being in said arm and said pins or screws passing through said slots into said posts, said arm, in the present case, being of the form of a segment of a circle. The frame is of the form of an annulus or an open ring, in which said vessel may be placed and by which it may be suspended, so as to bring its bottom further from or nearer to the fire.

Extending from and firmly connected with the arm E, is the handle J, whereby the former may be conveniently operated by the latter to place the vessel close to the fire in the opening in the plate of the stove, range, etc., or raise it therefrom and thus subject the vessel to more or less heat, as may be required for the purpose to which it is intended, it being seen that by lowering the handle, the frame D may be raised and with it the vessel thereon, and when said handle is let go or elevated, said frame is lowered, whereby the vessel is likewise lowered.

In order to guide the frame D in its vertical motions, and prevent swinging thereof, the same has pins K depending therefrom, the latter telescopically freely entering the tubes L which rise from the base A, the effect of which is evident.

In order to hold the vessel in its adjusted position when raised, I employ the standard M, the same having openings or recesses N therein one above the other as keepers to receive the nose of the bolt or catch P, which is pivotally mounted on the handle J, so that the frame D may be controlled as adjusted, as will be fully understood on reference to the figures, it being evident when the support is removed from the stove, etc., the parts remain in interlocked condition so as to be convenient and safe in carrying.

Having thus described my invention, what I claim as new and desire to secure by Letters Patent, is:—

1. A support for a vessel, of the character stated, comprising a base, a separate holder for said vessel, said holder being capable of vertical movements, a lever connected with the holder adapted to raise the same from its normal position, a bearing on said frame, on which the axis of said lever is mounted, a standard rising from said base and having keepers therein one above the other, and a locking device mounted on the handle member of said lever adapted to engage either of said keepers in the vertically-adjusted position of said holder.

2. A support for a vessel, of the character stated comprising a base, a separate holder for said vessel, a lever connected with said holder adapted to raise the same from its normal position, a bearing for the axis of said lever, a standard rising from said base and passing freely through the handle member of said lever, said standard having a keeper therein, and a catch which is mounted on said member and adapted to enter said keeper.

3. A support for a vessel, of the character stated comprising a base, a vertically movable open frame on which the vessel may be held above said base, a lever pivotally connected with said frame adapted to raise the same, and a bearing on said base for the axis of said lever.

4. A support for a vessel, of the character stated, comprising a base, a vertically movable member on which the vessel may be held, means mounted on said base for raising said member from its normal position, and means for guiding said member in its vertical movements comprising a plurality of pieces, one piece being fixed to said base and the other piece being connected with said member and slidably fitted to the first-named piece.

5. A support for a base, a vessel, of the character stated comprising a vertically movable frame on which the vessel may be held, a handled lever pivotally mounted on said base for raising said member from its normal position, and means for controlling said device in various vertical adjustments of said member, said means consisting of a post on said base, a plurality of openings in said post, the openings being one above the other, and a catch on the handle of said lever, said catch being adapted to enter either of said openings.

6. A support for a vessel, of the character stated comprising a vertically movable member on which the vessel may be held, a lever connected with said member adapted to raise the same from its normal position, a bearing for said lever, a standard having openings therein sustained adjacent to said lever, and a device on said lever adapted to engage either of the openings for locking said lever in the vertically adjusted position of said member.

JAMES J. KEEN.

Witnesses:
JOHN A. WIEDERSHEIM.
HARRY C. DALTON.